(12) United States Patent
Curtis et al.

(10) Patent No.: US 7,685,136 B2
(45) Date of Patent: Mar. 23, 2010

(54) METHOD, SYSTEM AND PROGRAM PRODUCT FOR MANAGING DOCUMENT SUMMARY INFORMATION

(75) Inventors: John D. Curtis, Millbury, MA (US); Raul H. Curbelo, Sturbridge, MA (US); Michelle S. Pflaum, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1261 days.

(21) Appl. No.: 11/033,790

(22) Filed: Jan. 12, 2005

(65) Prior Publication Data

US 2006/0152755 A1 Jul. 13, 2006

(51) Int. Cl.
*G06F 17/30* (2006.01)
(52) U.S. Cl. .................. 707/100; 707/101; 707/102
(58) Field of Classification Search ................ None
See application file for complete search history.

(56) References Cited

U.S. PATENT DOCUMENTS

| | | | |
|---|---|---|---|
| 5,878,398 A | | 3/1999 | Tokuda et al. |
| 6,009,442 A * | | 12/1999 | Chen et al. ............ 715/205 |
| 6,108,676 A | | 8/2000 | Nakatsuyama |
| 6,240,407 B1 * | | 5/2001 | Chang et al. ............ 707/2 |
| 6,289,353 B1 * | | 9/2001 | Hazlehurst et al. ......... 707/102 |
| 6,631,496 B1 * | 10/2003 | Li et al. ............ 715/200 |
| 6,772,141 B1 * | 8/2004 | Pratt et al. ............ 707/3 |
| 7,185,001 B1 * | 2/2007 | Burdick et al. ............ 707/3 |
| 2002/0010719 A1 * | 1/2002 | Kupiec ............ 707/526 |
| 2003/0050927 A1 * | 3/2003 | Hussam ............ 707/5 |
| 2003/0126553 A1 * | 7/2003 | Nagata ............ 715/500 |
| 2003/0140065 A1 * | 7/2003 | Lovvik et al. ............ 707/200 |
| 2004/0225667 A1 * | 11/2004 | Hu et al. ............ 707/100 |
| 2005/0021532 A1 * | 1/2005 | Ghandour ............ 707/100 |

* cited by examiner

*Primary Examiner*—Neveen Abel Jalil
*Assistant Examiner*—Bai D. Vu
(74) *Attorney, Agent, or Firm*—Daniel McLoughlin; Hoffman Warnick LLC

(57) ABSTRACT

Summary information for documents are stored as entries in a table in a relational database. Each entry includes a unique identifier, value(s) for a set of attributes and rendering information for the corresponding document. A collation order is obtained that defines a sort order for the documents based on the set of attributes. An index is generated based on the collation order and includes the rendering information for each document. In response to a rendering request or other query, a query that uses index-only access for the summary table can be used to obtain the rendering information. Further, a set of marker values can be included to provide efficient navigation of the index. Still further, additional functionality can be included to display the documents in a hierarchical structure. To this extent, the invention can automatically re-categorize data when the child locations of a hierarchical location exceed a specified number and/or link other relational data to a hierarchical location.

19 Claims, 6 Drawing Sheets

FIG. 4

| LOCATION | UNIQUE IDENTIFIER |
|---|---|
| 997 | UNID ENTRY #997 |
| 1263 | UNID ENTRY #2260 |
| 675 | UNID ENTRY #2935 |
| ... | ... |

72A → (row 1)
72B → (row 2)
72C → (row 3)

70

METHOD, SYSTEM AND PROGRAM PRODUCT FOR MANAGING DOCUMENT SUMMARY INFORMATION

BACKGROUND OF THE INVENTION

1. Technical Field

The invention relates generally to managing and navigating document summary information, and more particularly, to a solution for managing and navigating document summary information for a large number of documents (e.g., the content of the World Wide Web).

2. Background Art

Current solutions for browsing a content source, such as the World Wide Web, that includes a large number of documents provide relatively few organizational options. For example, a search engine may sort summary information for documents (e.g., web pages and other types of accessible files) by the presumed relevance of the entered search term(s). However, the display page for the results of a typical search frequently has a relatively short list of the resulting content. Consequently, the user is required to manually scroll through many display pages of results in order to locate the summary information for documents assigned a lower relevance by the search engine. In order to provide additional information in fewer display pages, a search engine may limit the number of documents at a particular location (e.g., web site) for which summary information is displayed. Further, some browsing solutions provide a taxonomic division and clustering of the documents that can be navigated to limit the searched and/or relevant documents for which summary information will be displayed.

On a smaller scale, numerous solutions effectively collate document summary information. In particular, document summary information is frequently collated into a hierarchy of categories, or the like. Similarly, messages and responses generated as part of a discussion forum or the like can be collated into a hierarchical structure. In either case, the user can selectively "drill down" the hierarchy by selecting a desired category/message (e.g., clicking on a "twisty" control). Further, current solutions frequently purge the collation document summary information that corresponds to a document to which a particular user does not have access privileges.

For example, the Lotus Notes® messaging and groupware software offered by International Business Machines Corp. of Armonk, N.Y. (IBM) can dynamically maintain and present document summary information in various types of user-defined and/or pre-de fined collations. However, current implementations of this type of technology are too inefficient to effectively manage the extremely large numbers of diverse documents that are available over large content sources such as the World Wide Web or the like.

In light of the above, a need exists for an improved solution for managing document summary information. In particular, there exists a need for a solution capable of managing one or more collations of document summary information for documents available from a data source such as the world wide web.

SUMMARY OF THE INVENTION

The invention provides a solution for managing document summary information. In particular, the invention obtains a set (one or more) of attributes that are used to define one or more collation orders. Each collation order defines a sort order for the document summary information based on the attributes. The summary information, including values for the set of attributes and rendering information, is obtained for each document and stored as an entry in a relational database table. An index for the table is generated and maintained for each collation order. The index includes the rendering information for each document. When the document summary information is to be navigated, searched, rendered, etc., a query can be used that uses index-only access for the summary table. In this manner, the response for the query can be quickly obtained.

To further improve the response time, a set of marker values can be managed, which identify periodic entries in the index. The marker values can be used to set a current entry in the index adjacent to requested data thereby reducing the amount of index entries that need to be walked to generate a response. Additionally, the invention can enable the document entries to be displayed in a hierarchical structure based on the collation order. Further, the invention can automatically re-categorize and re-distribute hierarchical locations based on a maximum distribution value. In this case, a plurality of new hierarchical locations can be automatically generated based on the parent hierarchical location and the summary information. Still further, the invention can link data stored in a relational table defined in any schema to one or more hierarchical locations for the document summary information. As a result, the invention provides a solution that enables summary information for a large amount of documents (e.g., documents available via the Internet) to be efficiently navigated, effectively displayed, and/or annotated with additional relevant information.

A first aspect of the invention provides a method of managing document summary information, the method comprising: obtaining a collation order based on a set of attributes for a plurality of documents; for each of the plurality of documents, obtaining summary information for the document, wherein the summary information includes a value for each of the set of attributes and rendering information for displaying a summary of the document; creating a document entry based on the summary information, wherein the document entry includes a unique identifier for the document and the summary information; and storing the document entry in a summary table in a relational database; and generating an index for the summary table based on the collation order, wherein the index includes the unique identifier and rendering information for the document entry in the summary table for each of the plurality of documents.

A second aspect of the invention provides a method of managing document summary information, the method comprising: managing a set of collation orders, wherein each collation order defines a sort order for summary information for a plurality of documents based on a set of attributes for the plurality of documents; managing a summary table in a relational database, wherein the summary table includes a document entry for each of the plurality of documents and wherein each document entry includes a unique identifier for the document, a value for each of the set of attributes and rendering information for displaying a summary of the document; and managing a set of indexes for the summary table, wherein each index is based on one of the set of collation orders, and wherein each index includes the unique identifier and the rendering information for each document entry.

A third aspect of the invention provides a document system for managing document summary information, the document system comprising: a system for managing a set of collation orders, wherein each collation order defines a sort order for summary information for a plurality of documents based on a set of attributes for each of the plurality of documents; a system for managing a summary table in a relational database, wherein the summary table includes a document entry for each of the plurality of documents and wherein each document entry includes a unique identifier for the document, a value for each of the set of attributes and rendering information for displaying a summary of the document; and a system for managing a set of indexes for the summary table, wherein each of the set of indexes is based on one of the set of collation orders, and wherein each index includes the unique identifier and the rendering information for each document entry.

A fourth aspect of the invention provides a document system for managing document summary information, the document system comprising: a system for obtaining a collation order based on a set of attributes for a plurality of documents; a system for obtaining summary information for each of the plurality of documents, wherein the summary information includes a value for each of the set of attributes and rendering information for displaying a summary of the document; a system for creating a document entry based on the summary information, wherein the document entry includes a unique identifier for the document and the summary information; a system for storing the document entry in a summary table in a relational database; and a system for generating an index for the summary table based on the collation order, wherein the index includes the unique identifier and rendering information for the document entry in the summary table for each of the plurality of documents.

A fifth aspect of the invention provides a program product stored on a computer-readable medium, which when executed, manages document summary information, the program product comprising: program code for obtaining a collation order based on a set of attributes for a plurality of documents; program code for obtaining summary information for each of the plurality of documents, wherein the summary information includes a value for each of the set of attributes and rendering information for displaying a summary of the document; program code for creating a document entry based on the summary information, wherein the document entry includes a unique identifier for the document and the summary information; program code for storing the document entry in a summary table in a relational database; and program code for generating an index for the summary table based on the collation order, wherein the index includes the unique identifier and rendering information for the document entry in the summary table for each of the plurality of documents.

A sixth aspect of the invention provides a program product stored on a computer-readable medium, which when executed, manages document summary information, the program product comprising: program code for managing a set of collation orders, wherein each collation order defines a sort order for summary information for a plurality of documents based on a set of attributes for each of the plurality of documents; program code for managing a summary table in a relational database, wherein the summary table includes a document entry for each of the plurality of documents and wherein each document entry includes a unique identifier for the document, a value for each of the set of attributes and rendering information for displaying a summary of the document; and program code for managing a set of indexes for the summary table, wherein each of the set of indexes is based on one of the set of collation orders, and wherein each index includes the unique identifier and the rendering information for each document entry.

A seventh aspect of the invention provides a method of deploying an application for managing document summary information, the method comprising: providing a computer infrastructure being operable to: manage a set of collation orders, wherein each collation order defines a sort order for summary information for a plurality of documents based on a set of attributes for each of the plurality of documents; manage a summary table in a relational database, wherein the summary table includes a document entry for each of the plurality of documents and wherein each document entry includes a unique identifier for the document, a value for each of the set of attributes and rendering information for displaying a summary of the document; and manage a set of indexes for the summary table, wherein each of the set of indexes is based on one of the set of collation orders, and wherein each index includes the unique identifier and the rendering information for each document entry.

An eighth aspect of the invention provides computer software embodied in a propagated signal for managing document summary information, the computer software comprising instructions to cause a computer system to perform the following functions: manage a set of collation orders, wherein each collation order defines a sort order for summary information for a plurality of documents based on a set of attributes for each of the plurality of documents; manage a summary table in a relational database, wherein the summary table includes a document entry for each of the plurality of documents and wherein each document entry includes a unique identifier for the document, a value for each of the set of attributes and rendering information for displaying a summary of the document; and manage a set of indexes for the summary table, wherein each of the set of indexes is based on one of the set of collation orders, and wherein each index includes the unique identifier and the rendering information for each document entry.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 4 shows an illustrative set of marker values that correspond to an index according to one embodiment of the invention;

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing document summary information. In particular, the invention obtains a set (one or more) of attributes that are used to define one or more collation orders. Each collation order defines a sort order for the document summary information based on the attributes. The summary information, including values for the set of attributes and rendering information, is obtained for each document and stored as an entry in a relational database table. An index for the table is generated and maintained for each collation order. The index includes the rendering information for each document. When the document summary information is to be navigated, searched, rendered, etc., a query can be used that uses index-only access for the summary table. In this manner, the response for the query can be quickly obtained.

To further improve the response time, a set of marker values can be managed, which identify periodic entries in the index. The marker values can be used to set a current entry in the index adjacent to requested data thereby reducing the amount of index entries that need to be walked to generate a response. Additionally, the invention can enable the document entries to be displayed in a hierarchical structure based on the collation order. Further, the invention can automatically re-categorize and re-distribute hierarchical locations based on a maximum distribution value. In this case, a plurality of new hierarchical locations can be automatically generated based on the parent hierarchical location and the summary information. Still further, the invention can link data stored in a relational table defined in any schema to one or more hierarchical locations for the document summary information. As a result, the invention provides a solution that enables summary information for a large amount of documents (e.g., documents available via the Internet) to be efficiently navigated, effectively displayed, and/or annotated with additional relevant information.

Figure 1:
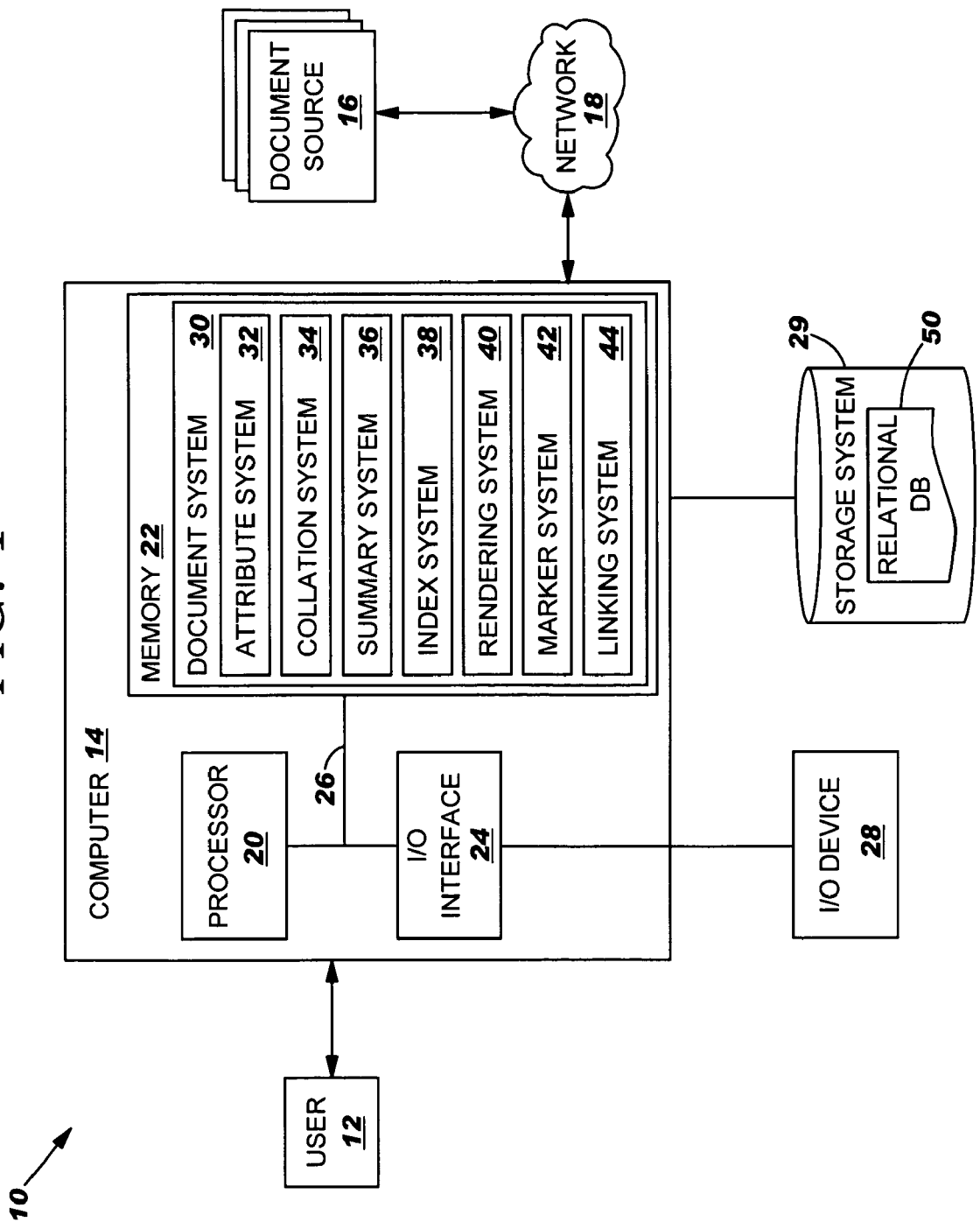
FIG. 1 shows an illustrative system for managing document summary information according to one embodiment of the invention.

Turning to the drawings, FIG. 1 shows an illustrative system 10 for managing document summary information. For example, user 12 can interact with computer 14 to request that document system 30 render collated document summary information. Document system 30 can obtain the document summary information from various documents that are accessible from one or more document sources 16. Subsequently, document system 30 can manage the document summary information using a relational database 50, and respond to the request based on one or more queries of relational database 50.

Document system 30 is shown implemented on computer 14 as computer program code. To this extent, computer 14 is shown including a processor 20, a memory 22, an input/output (I/O) interface 24, and a bus 26. Further, computer 14 is shown in communication with an external I/O device/resource 28 and a storage system 29. In general, processor 20 executes computer program code, such as document system 30, that is stored in memory 22 and/or storage system 29. While executing computer program code, processor 20 can read and/or write data, such as relational database 50, to/from memory 22, storage system 29, and/or I/O interface 24. Bus 26 provides a communication link between each of the components in computer 14. I/O device 28 can comprise any device (e.g., keyboard, pointing device, display, etc.) that enables user 12 to interact with computer 14 and/or any device (e.g., network card, modem, etc.) that enables computer 14 to communicate with one or more other computing devices, such as document source(s) 16.

As shown, communications between computer 14 and document source(s) 16 can occur over one or more networks 18. Similarly, user 12 could operate another computing device (not shown) that communicates with computer 14 via network(s) 18. To this extent, network 18 can comprise any combination of various types of communications links. For example, network 18 can comprise addressable connections that may utilize any combination of wired and/or wireless transmission methods. Further, network 18 can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 14 is only representative of various possible computer infrastructures that can include numerous combinations of hardware. For example, processor 20 may comprise a single processing unit, or be distributed across one or more processing units in one or more locations, e.g., on a client and server. Similarly, memory 22 and/or storage system 29 can comprise any combination of various types of data storage and/or transmission media that reside at one or more physical locations. Further, I/O interface 24 can comprise any system for exchanging information with one or more I/O devices 28. Still further, it is understood that one or more additional components (e.g., system software, math co-processor, etc.) not shown in FIG. 1 can be included in computer 14. To this extent, computer 14 can comprise any type of computing device such as a network server, a desktop computer, a laptop, a handheld device, a mobile phone, a pager, a personal data assistant, etc. However, if computer 14 comprises a handheld device or the like, it is understood that one or more I/O devices 28 (e.g., a display) and/or storage system 29 could be contained within computer 14, not externally as shown. Regardless, it is understood that document source(s) 16 can comprise similar components as shown and/or discussed with respect to computer 14. These components have not been separately shown for brevity.

As discussed further below, document system 30 manages document summary information. To this extent, document system 30 is shown including an attribute system 32 for obtaining a set of attributes for documents, a collation system 34 for managing a set of collation orders that are each based on the collation attributes, and a summary system 36 for obtaining summary information for each document. Additionally, document system 30 is shown including an index system 38 for managing a set of indexes, in which each index is based on a collation order, a rendering system 40 for processing a rendering request, a marker system 42 for managing a set of marker values, and a linking system 44 for managing a set of linking entries, in which each linking entry links data stored in a relational table row to a document and/or a category for the documents. Operation of each of these systems is discussed further below. However, it is understood that some of the various systems shown in FIG. 1 can be implemented independently, combined, and/or stored in memory for one or more separate computers 14 that communicate over a network. Further, it is understood that some of the systems/functionality may not be implemented and/or additional systems/functionality may be included as part of system 10.

Document system 30 can enable user 12 to effectively view/navigate document summary information for a large number of documents. As used herein, the term "document" refers to any group of related data. To this extent, a document can comprise a web page, a data file having any format, an e-mail message, an instant message, or other type of collection of data accessible via a public/private network such as the Internet. Further, the term "summary information" refers to data that provides a summary of the content and/or one or more attributes of the corresponding document. In general, user 12 will view/navigate the document summary information for a group of documents in order to determine and/or select one or more documents he/she may desire to view in its entirety.

The document summary information is collated and/or determined based on one or more attributes of the document. To this extent, attribute system 32 obtains a set of attributes for the documents. An "attribute" of a document comprises any type of data that describes a particular aspect of the document. For example, several attributes can be based on what the document looks like on a storage device. These attributes, such as an access location, a creation/revision date/time, a size, a data format, and the like, are universal to all documents. Additional attributes can be derived and/or obtained from the content of the document itself. These attributes can include a title, an author, a categorization, and/or other identifying information.

A common solution for obtaining the latter attributes is the use of a set of rules. For example, document management software such as Lotus Domino(& offered by IBM and/or a relational database such as DB2® offered by IBM include libraries of functions that can be used to construct the set of rules for deriving and/or obtaining one or more document attributes. In one embodiment, attribute system 32 receives the set of attributes, which have been defined using another system. Alternatively, attribute system 32 can manage an interface that enables user 12 to define, remove, and/or modify various attributes from the set of attributes. To this extent, user 12 can operate attribute system 32 to define/modify various rules for obtaining values for various attributes as discussed above.

Collation system 34 can obtain one or more collation orders that are each based on the set of attributes. In one embodiment, collation system 34 can manage an interface that enables user 12 to define/modify a collation order. Further, collation system 34 can receive a collation order, which has been defined using another system (e.g., Lotus Notes). In any event, each collation order defines how the documents are sorted based on some/all of the set of attributes. For example, a collation order can define that the documents should be initially sorted based on the author's last name, then, for duplicate last names, sorted by the author's first name, and finally for the same author, by the title of the document. Additionally, another collation order may define that the documents should be initially sorted by date, then by title. It is understood that these collation orders and attributes are only illustrative of many possible collation orders and attributes. To this extent, the invention is not limited to these particular examples. Further, it is understood that any number of attributes can be used in any combination to define a particular collation order.

Summary system 36 obtains summary information for each document to be collated based on the collation order. The summary information for each document includes a value for each of the set of attributes obtained by attribute system 32. Additionally, the summary information includes rendering information that is not used in the collation order to sort the documents, but is used for displaying a summary of the document to user 12 when the collation order is rendered for a set of documents. For example, the rendering information may include a summary of the content of the document. Additionally, the rendering information may include one or more of the set of attributes that are not used in the collation order.

Summary system 36 can obtain the summary information using any known solution. For example, a document can comprise data that includes the values for some or all of the summary information. Additionally, another system (e.g., document source 16) and/or user 12 can provide some or all of the summary information for a particular document to summary system 36. In one embodiment, summary system 36 automatically determines the summary information for each document. For example, summary system 36 can include a crawler or the like that automatically gathers document data on documents available from various document sources 16. Summary system 36 can then analyze the document data to determine the summary information for each document. In this case, one or more rules defined by attribute system 32 as discussed above, can be used to determine the values and/or rendering information.

Figure 2:
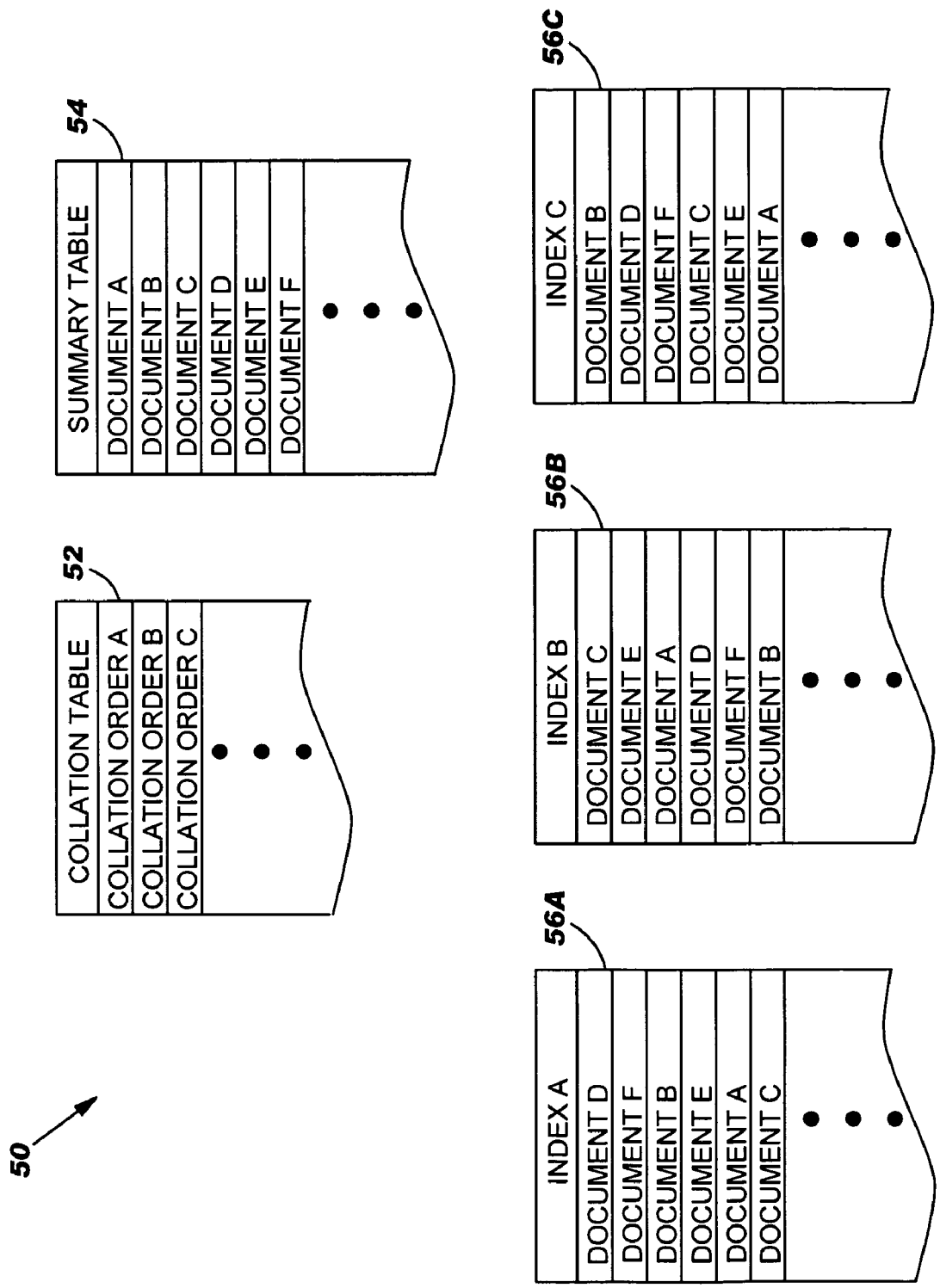
FIG. 2 shows an illustrative relational database according to one embodiment of the invention.

Document system 30 uses a relational database 50 to manage the information for the documents. For example, FIG. 2 shows an illustrative relational database 50 that includes a collation table 52 and a summary table 54. As discussed above, collation system 34 (FIG. 1) can obtain one or more collation orders. To this extent, collation system 34 can generate a collation order entry based on a collation order and store the collation order entry in collation table 52. For example, a collation order entry can include a unique identifier, a name for the collation order, a set of columns that defines the set of attributes, a set of columns that defines the sort order, and a set of columns that defines the rendering information. It is understood that various other data can be stored for each collation order. Further, it is understood that the collation order data could be stored in multiple tables, not merely in a single collation table 52 as shown. For example, data on the set of attributes could be stored in a separate attribute table and referenced by each collation order entry as is known in the art.

Similarly, summary system 36 (FIG. 1) can create and store a document entry in summary table 54 that includes the summary information for a corresponding document. To this extent, each document entry can comprise a set of columns, each of which stores the value for a corresponding attribute. In one embodiment, each document entry can support up to twelve attributes, and the value for each attribute can be stored in one of a plurality of data types. For example, each attribute could have a value stored in any one of a text data type, a numeric data type (e.g., a double precision floating point number), or a date/time data type. In this case, summary table 54 can comprise twelve columns for storing attribute values having a text data type, twelve columns for storing attribute values having a numeric data type, and twelve columns for storing attribute values having a date/time data type. This enables each attribute to have values comprising a mix of data types, thereby overcoming the limitation of strong data typing in a typical relational database. As a result, the various documents and corresponding attributes do not need to be formatted in a particular manner.

For example, a third attribute in a sort order can comprise a date field. In this case, the third text column can have values such as "N/A," "Not provided," "Unknown," etc., which may be included in a document in which the date can not be determined, while valid dates are stored in the third date/time column. Subsequently, when the third attribute is sorted, entries having a date in the third date/time column can be grouped together, while entries having data in the third text column can be grouped together. In a standard query language (SQL) query, for example, the "order by" clause can be used to group the data. To this extent, an order by clause for the example described above could comprise "order by s1, s2, d3, s3" in which s1 is the first attribute in the sort order (e.g., author's last name), s2 is the second attribute in the sort order (e.g., author's first name), and d3 and s3 are the third attribute in the sort order (e.g., date). In this case, for each entry without a date, d3 would be NULL, and all the s3 entries having text would be sorted apart from the entries having a valid date. However, it is understood that the number of attributes and formats for attributes are only illustrative, and the invention is not limited to this particular embodiment. In any event, each document entry can comprise additional data such as a unique identifier for the document, one or more columns for storing the rendering information (e.g., as a large object), a modified time, an identifier of the corresponding collation order, etc. Additionally, a different summary table 54 can be used for different collation orders or the same document entries can be used for multiple collation orders.

Referring to both FIGS. 1 and 2, summary table 54 can comprise document entries for a large number of documents. For example, as discussed above, the documents can comprise those documents available over a public network 18 such as the Internet, or a similar large and diverse set of document sources 16. As a result, document system 30 requires an efficient solution for accessing the information defined by and stored in summary table 54 and collation table 52. To this extent, index system 38 can generate an index for summary table 54 based on a collation order. For example, relational database 50 is shown including indexes 56A-C for summary table 54, each of which corresponds to a collation order entry in collation table 52. Each index 56A-C defines the sort order for the document entries in summary table 54 based on the sort order defined by the corresponding collation order entry in collation table 52, and can be generated using any known solution in the art of relational database management. Further, index system 38 can manage each index 56A-C as document entries in summary table 54 are added, deleted, modified, etc., by summary system 36.

As is known in the art, each entry in indexes 56A-C includes the unique identifier for the corresponding document entry in summary table 54 as well as an indication of the next and/or previous entry in the sorted list. Additionally, to maximize the efficiency with which information can be retrieved, each entry in indexes 56A-C can further include the rendering information and/or set of attribute values for the corresponding document entry. In this case, rendering system 40 can receive a rendering request based on a collation order. In response to the rendering request, rendering system 40 can generate a rendering response using a query that uses index-only access for the summary table. In particular, rendering system 40 can determine a collation order that corresponds to the rendering request, and select an appropriate index 56A-C for the summary table based on the corresponding collation order. For example, the query can comprise a standard query language (SQL) query, and rendering system 40 can determine the corresponding collation order based on an "order by" clause included in the query, as is known in the art. In any event, the data for the rendering response can be obtained from the selected index 56A-C, without accessing any entries in summary table 54. As a result, the invention incorporates common optimization techniques available in relational database systems.

Rendering system 40 can manage an interface that enables user 12 to generate the rendering request, or the rendering request can be communicated from another system. In either case, the rendering request will define the relevant documents (e.g., by a select clause in a SQL statement) and a desired sort order for the documents. To this extent, the rendering request could comprise a desired query. Alternatively, rendering system 40 can generate an appropriate query based on the information included in the rendering request. For example, rendering system 40 can obtain/generate a SQL statement that selects an appropriate index 56A-C. Rendering system 40 can explicitly or implicitly select an appropriate index 56A-C. In one embodiment, rendering system 40 provides the SQL statement to a relational database manager that determines the appropriate index 56A-C based on the SQL statement. In any event, after receiving data from relational database 50 in response to the query, rendering system 40 can include the data in the rendering response. Subsequently, the rendering response can be communicated to another system or used by rendering system 40 for display to user 12.

Figure 3:
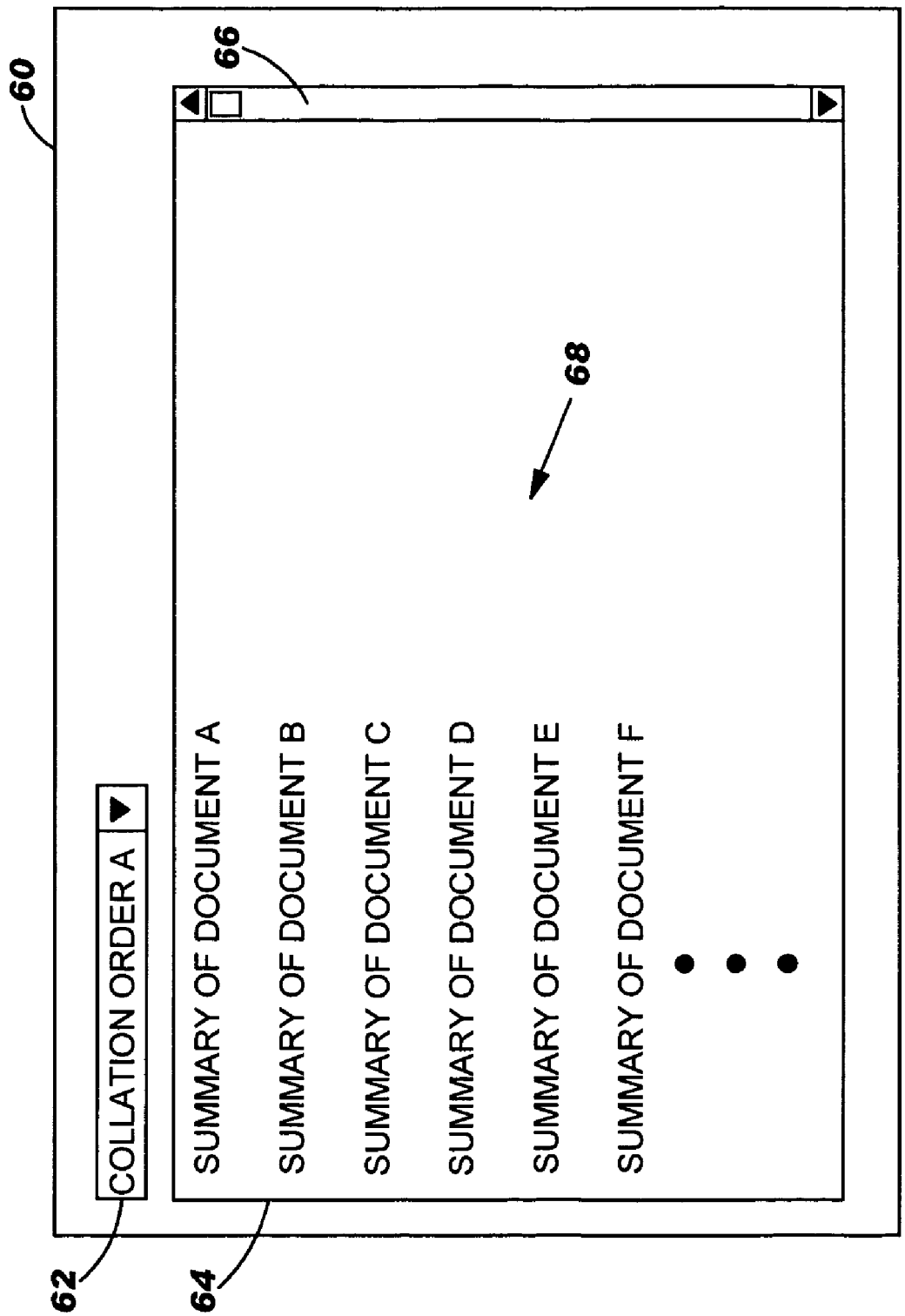
FIG. 3 shows an illustrative display interface for displaying the results of a rendering request.

FIG. 3 shows an illustrative display interface 60 for displaying the results of a rendering request. Display interface 60 is shown including a text box 62 that displays information on the collation order that was used to generate the displayed result. For example, text box 62 can display the name of the collation order, details of the sort order defined by the collation order, etc. Additionally, as shown in FIG. 3, text box 62 can enable user 12 (FIG. 1) to select an alternative collation order by, for example, selecting a new collation order using a drop down box. Should user 12 select an alternative collation order, a new rendering request will be generated, and the index 56A-C (FIG. 2) that corresponds to the selected collation order will be used to generate new results. It is understood that the use of a drop down box is only illustrative of numerous ways for designating a desired sort order and the invention is not limited to this solution. For example, document summary information 68 could be displayed in a table, and user 12 could select a particular column of the table by which to sort document summary information 68.

In any event, document summary information 68 is displayed in a display area 64. As is known, display area 64 includes a finite amount of area within which to display document summary information 68. As a result, document summary information 68 returned by rendering system 40 (FIG. 1) can be limited to the amount of information (e.g., rows) capable of being displayed. However, rendering system 40 can further include in the rendering response information that specifies a location within the sorted documents that the displayed document summary information 68 is located and/or a total number of documents available for display. Using this information, display area 64 can include a scroll bar 66 that allows user 12 to select a location anywhere within the sorted documents for display. For example, user 12 could move the location of the scroll box to a position halfway down scroll bar 66. For four billion documents, this action would request the display of the two billionth document. It is understood, however, that scroll bar 66 is only illustrative, and display interface 60 can include any solution known in the art for allowing user 12 to select a location within the documents.

Referring to FIGS. 1-3 collectively, when user 12 selects a new display location within document summary information 68, rendering system 40 will receive a rendering request that specifies the selected location (e.g., the two billionth document as discussed above). In response, rendering system 40 can use a query that retrieves the rendering information from the appropriate index 56A-C, and generate the rendering response with the rendering information. However, when the number of documents is sufficiently large, this operation, even using an index 56A-C, can require a large amount of processing time. For example, in order to relocate from the first entry in index 56A to the billionth entry, a typical relational database manager will sequentially traverse the index entries from the beginning until the billionth entry is found.

To make the relocation operation and other types of seek operations more efficient, marker system 42 can manage a set of marker values based on a corresponding index 56A-C. In general, each marker value identifies a periodic entry in the corresponding index 56A-C and a corresponding unique identifier for the periodic entry. For example, FIG. 4 shows an illustrative set of marker values 70 that correspond to an index, such as index 56A (FIG. 2), in which each marker value 72A-C identifies approximately every one thousandth entry in index 56A. In this case, marker system 42 can initially create marker values 72A-C for every one thousandth entry in index 56A. In particular, each marker value 72A-C is assigned a location that comprises a number of entries between the marker value 72A-C and the previous marker value 72A-C (or start of index for the first marker value 72A) and stores the corresponding unique identifier (UNID) for that document entry.

However, referring to FIGS. 1-4 collectively, as document entries are added and removed from summary table 54 and index 56A is modified to reflect the changes, the location of a marker value 72A-C will change. For example, if a document entry is added at location #702, the unique identifier for marker value 72A would correspond to the 998th entry. In response, marker system 42 can increment or decrement the value for the location of the marker value 72A-C that is affected by the change. When marker system 42 determines that a location value for a marker value 72A-C is too small (e.g., less than five hundred) or too large (e.g., greater than one thousand five hundred), then marker system 42 can either remove the marker value (too small) or add a new marker value (too large) accordingly.

In any event, when rendering system 40 receives a rendering request such as a relocation request, rendering system 40 can set a current entry in the corresponding index 56A based on the rendering request and set of marker values 70. In particular, rendering system 40 can provide the requested location and corresponding index 56A to marker system 42. In response, marker system 42 can identify the marker value 72A-C that corresponds to the closest location in index 56A that is less than the requested location, and provide the unique identifier that corresponds to the identified marker value 72A-C to rendering system 40. Rendering system 40 then can use the unique identifier to set the current entry in index 56A. In this manner, entries in index 56A will only need to be sequentially traversed from the identified entry, and not from the beginning of index 56A, in order to obtain the response data for the rendering request.

Set of marker values 70 can be stored in any known format. In one embodiment, set of marker values 70 is stored as a large object column in collation table 52 for the collation order entry that corresponds to the index 56A-C, and is read into memory when required. It is understood that set of marker values 70 is only illustrative of numerous possible implementations. For example, while the location is described as being relative to a previous location, each location could comprise an absolute value based on the number of entries from the beginning of the index. Further, when index 56A is modified, marker system 42 could adjust the unique identifier(s) that correspond to one or more periodic entries (e.g., every one thousandth) rather than the location for each marker value 72A-C. Still further, marker values 72A-C could include additional information, such as one or more attributes, instead of or in addition to the unique identifier of a corresponding document entry.

Figure 5:
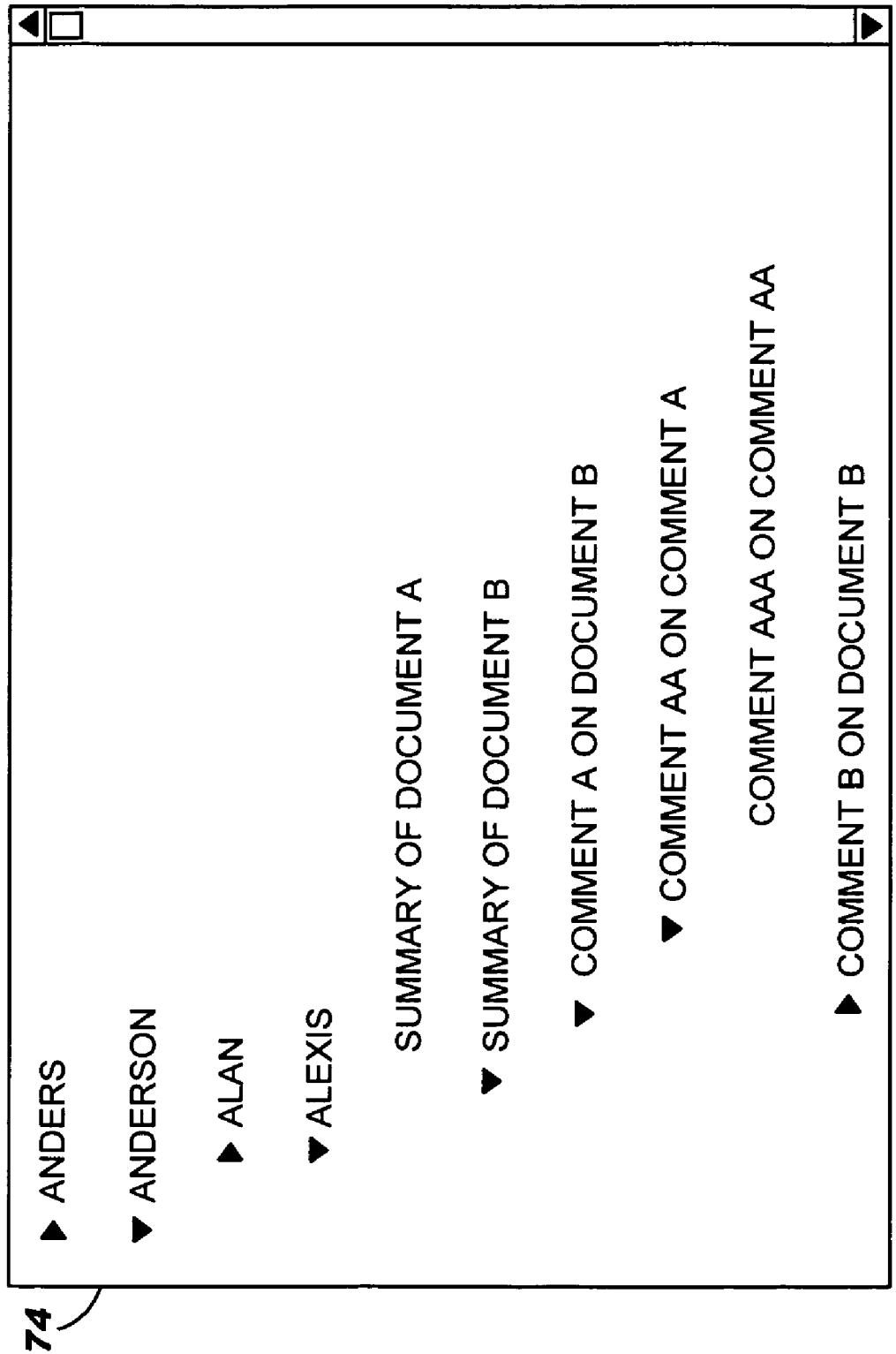
FIG. 5 shows an illustrative display interface for displaying sorted document summaries in a categorized hierarchical arrangement.

In addition to displaying sorted document summaries as a list, document system 30 can support the display of document summaries in a hierarchical arrangement. For example, a categorized hierarchical arrangement can be defined by each collation order. In particular, each attribute used in the sort order can comprise a taxonomic grouping for the documents (i.e., a category) and a level in the hierarchy. FIG. 5 shows an illustrative display interface 74 for displaying sorted document summaries in a categorized hierarchical arrangement. As shown, the document summaries can be sorted by categories that comprise the author's last name and the author's first name. Additionally, "twistees" are used to indicate the presence of one or more entries below each category in the hierarchical arrangement and a scroll bar can be included to allow user 12 (FIG. 1) to navigate quickly to a desired location in the hierarchical arrangement.

When a large number of categories and documents are present, the hierarchical arrangement cannot be efficiently created upon the rendering of the hierarchical arrangement. As a result, additional data can be stored in relational database 50 (FIG. 1) in order to support its display. In one embodiment, a navigational handle is determined for each document and is stored in the document entry for the document. The navigational handle can comprise a vector of identifiers (e.g., thirty-two bit integers) that identifies the location of the document in the hierarchical arrangement. For example, a navigational handle of {14, 5, 7} would identify the seventh child of the fifth child of the fourteenth top-level category. In order to efficiently navigate the hierarchical arrangement, marker system 42 (FIG. 1) can include the navigational handle in each marker value 72A-C (FIG. 4). In this case, given a navigational handle, marker system 42 can efficiently locate the unique identifier of an index entry that is within a relatively small number of entries (e.g., one thousand) of the index entry for the document located at the navigational handle.

In general, summary system 36 (FIG. 1) can determine the set of categories based on the collation order. In particular, as documents are being processed by summary system 36 and a new value for one of the attributes is received, summary system 36 can determine a hierarchical location for the document based on the collation order (e.g., last name, first name). When no category entry is found, summary system 36 can identify the new set of attributes as a new category in the hierarchical arrangement. In response, summary system 36 can generate one or more category entries for the new category and store each category entry in relational database 50 (FIG. 1). In one embodiment, each category entry is stored in summary table 54 (FIG. 2) as a document entry. Additionally, each category entry and document entry includes the unique identifier for the parent of the category/document entry in the hierarchical arrangement. In this manner, the category entries can be sorted along with the document entries and efficiently rendered for display to user 12 (FIG. 1).

Returning to FIG. 1, the rendering of other types of hierarchical arrangements can be supported by document system 30. To this extent, document system 30 can support a permuted categorized hierarchical arrangement in which a document entry may appear in multiple locations in the hierarchical arrangement (e.g., under multiple categories). For example, a document may have multiple authors. In this case, the document can appear under both authors' names in the categorized hierarchical arrangement. In one embodiment, index system 38 generates a unique index entry in the corresponding index 56A-C (FIG. 2) for each hierarchical location for the document entrysummary table. Alternatively, summary system 36 can generate multiple document entries that are stored in summary table 54 for each hierarchical location, and index system 38 can generate a single entry for each document entry. In any event, the document summary information will be displayed in multiple locations in the categorized hierarchical arrangement.

Additionally, document system 30 can support a response hierarchy. In general, a response hierarchy comprises a tree of documents that are provided in response to one another. For example, in a discussion form, a first document may be submitted inquiring about a problem. Subsequently, one or more documents can be submitted proposing solutions to the problem. Still further, one or more documents may be submitted commenting on a proposed solution, etc. In this case, the various documents can be displayed in a hierarchical structure. In general, summary system 36 can determine the unique identifier for the document for which a new response document was submitted and store it as the parent identifier together with the response document's unique identifier in summary table 54. Subsequently, when managing an index for summary table 54 for a collation order that includes the response hierarchy, the index entries can be sorted by the parent and child unique identifiers. While the various types of hierarchical arrangements have been discussed separately, it is understood that a collation order may include multiple types of hierarchical arrangements. For example, as shown in FIG. 5, "DOCUMENT B" is listed in a categorized hierarchy by author and includes a response hierarchy of comments submitted about the document and/or other comments as children in the hierarchical arrangement.

When displaying document summary information in a hierarchical structure, it may be desirable to limit the number of children allowed for each hierarchical location. To this extent, rendering system 40 can obtain a maximum distribution value that comprises the maximum number of child locations (e.g., categories, documents, etc.) for each hierarchical location. In one embodiment, the period used for the marker values described above (e.g., one thousand) is used as the maximum distribution value. Alternatively, rendering system 40 can receive the maximum distribution value from user 12 and/or another system. In any event, rendering system 40 can determine that a hierarchical location includes a number of child locations that exceeds the maximum distribution value.

In response, rendering system 40 can automatically generate a plurality of new hierarchical locations based on the hierarchical location. In particular, two or more new hierarchical locations can be generated such that each one of the new hierarchical locations includes a number of child locations that, after they have been relocated to one of the new hierarchical locations, is less than the maximum distribution value. In one embodiment, rendering system 40 can select an additional attribute to categorize based on the summary information. For example, a collation order can define that documents are to be sorted by author last name and author first name. Further, the collation order can designate date as a third attribute that is only to be used once the number of child documents of a hierarchical location exceed the maximum distribution value. Alternatively, rendering system 40 can automatically generate a new attribute based on the rendering information. For example, the date discussed above could be included in the rendering information and not as an optional attribute in the collation order. In either case, a number of and range for values for the new attribute (e.g., 1999-2002 and 2003-Present) can be selected to provide a relatively even distribution of the child locations under the new hierarchical locations.

Figure 6:
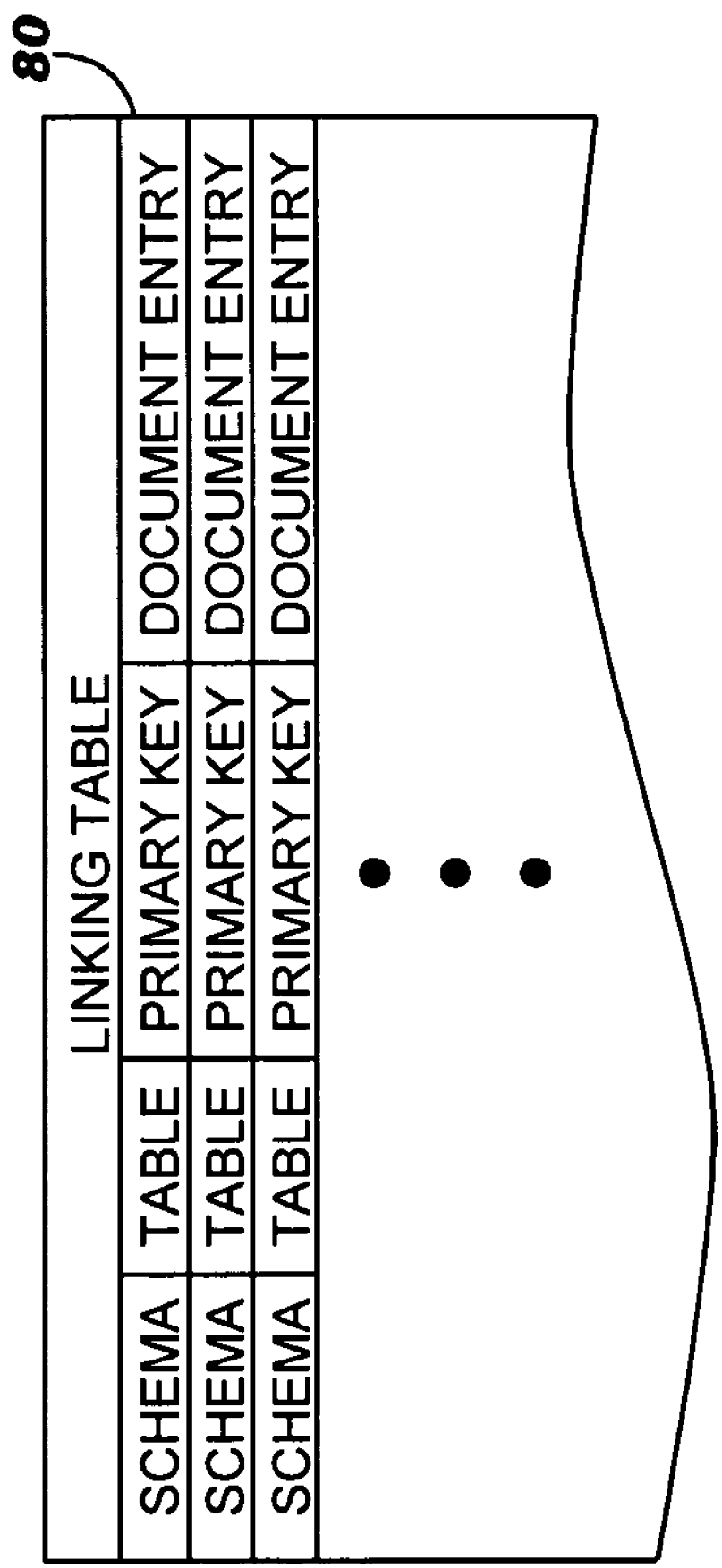
FIG. 6 shows an illustrative linking table according to one embodiment of the invention.

Document system 30 can also provide extended linking functionality. In particular, document system 30 can include a linking system 44 that can link one or more documents/categories stored in summary table 54 (FIG. 2) with related data stored in any relational database. Linking system 44 can manage a linking table that implements this functionality. For example, FIG. 6 shows an illustrative linking table 80 according to one embodiment of the invention. In particular, each entry in linking table 80 comprises columns that define a schema name, a table name, and primary key column(s) for data stored in a relational database that is to be linked to a document entry. Additionally, the linking table can include one or more columns that identify the document entry (e.g., by its unique identifier).

Linking system 44 can add, delete, modify, etc., entries in linking table 80 based on one or more requests. To this extent, rendering system 40 can receive a linking request that requests the creation of a link. For example, when a portion of a hierarchical structure is displayed as shown in FIG. 5, user 12 could "drag-and-drop" from another display area data stored in one or more relational table row(s) to a target document/category in the displayed hierarchical structure. In response, rendering system 40 and/or an external system can generate a linking request that identifies the relational table row(s) and the target document/category. Linking system 44 then can create a linking entry based on the identifying information. In particular, the schema, table, and primary key information for the source data can be stored in the linking entry as well as the unique identifier of the linked document. Subsequently, linking system 44 can store the linking entry in the linking table in relational database 50.

When rendering system 40 receives a request for navigating/rendering a portion of the document summary information, linking system 44 can determine if the linking table includes a linking entry for any category/document summary information that is to be provided in response to the request. If so, then linking system 44 can obtain the linked data, and rendering system 40 can incorporate the linked data into the rendering response.

The invention can be implemented using various known solutions. In one embodiment, the invention is implemented as program code, such as a class written using the Java programming language. In this case, the class can be deployed to a computing infrastructure as an application that comprises a Java library, or the like, having a published interface that comprises various functions for managing the document summary information. The functions can include various functions for creating, modifying, and deleting a document entry, such as functions for setting attribute values, rendering information, etc., as well as, when a hierarchical structure is implemented, a function for automatically re-categorizing children of a particular hierarchical location as discussed above.

Further, several functions for navigating the document entries can be provided. These functions can include a "goto" function for navigating to a specified index entry, a "locate" function that can locate a specified document entry in a hierarchical structure, a "search" function that can locate a specified document entry, etc. Other functions can be provided for traversing specified document entries (e.g., all children of a hierarchical location), fetch a specified number of entries starting with a particular entry, etc. Still further, when linking is implemented, functions can be included that link a source relational table row to a particular hierarchical location, delete the link, obtain information on the link (e.g., the unique identifier for the hierarchical location), etc.

It should be appreciated that the teachings of the present invention could be offered as a business method on a subscription, advertising, and/or fee basis. For example, document system 30 (FIG. 1) and/or a computer infrastructure such as computer 14 (FIG. 1) could be generated, maintained, supported and/or deployed by a service provider that offers the functions described herein for customers. That is, a service provider could offer to manage document summary information as shown and discussed above. To this extent, the invention can further comprise providing a computer infrastructure and deploying an application that is operable to perform the invention to the computer infrastructure. In one embodiment, various aspects of the invention are included to enhance the functionality provided by an Internet search engine or the like.

It is understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized.

The present invention also can be embedded in a computer program product that is stored on a computer-readable medium and/or embodied as a propagated signal communicated between two systems, which comprises all the respective features enabling the implementation of the methods described herein, and which—when loaded in a computer system/deployed to a computing infrastructure—is able to carry out these methods. Computer program product, application, software program, program, and software, are synonymous in the present context and mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer implemented method of managing document summary information, the method comprising:
    obtaining, on a computer device, a collation order based on a set of attributes for a plurality of documents;
    for each of the plurality of documents,
        obtaining summary information for the document, using the computer device, wherein the summary information includes a value for each of the set of attributes and rendering information for displaying a summary of the document;
        creating a document entry based on the summary information, wherein the document entry includes a unique identifier for the document and the summary information; and
        storing the document entry in a summary table in a relational database; and
    generating an index for the summary table based on the collation order, using the computer device, wherein the index includes the unique identifier, the set of attributes values, and rendering information for the document entry in the summary table for each of the plurality of documents;
    receiving a rendering request;
    determining a corresponding collation order for the rendering request;
    selecting an appropriate index for the summary table based on the corresponding collation order;
    generating a rendering response using a query that uses index-only access of the appropriate index for the summary table;
    obtaining a second collation order based on the set of attributes;
    generating a second index for the summary table based on the second collation order; and
    generating a set of categories for the collation order, wherein the set of categories defines a hierarchical structure for displaying the document summary information, and wherein each of the plurality of documents is located under at least one category, wherein the generating the set of categories step includes automatically generating a plurality of new categories based on a category that includes a number of child hierarchical locations that exceeds a maximum distribution value.

2. The method of claim 1, further comprising defining the set of attributes for sorting the plurality of documents.

3. The method of claim 1, wherein the obtaining summary information step includes automatically determining the summary information for each of the plurality of documents.

4. The method of claim 1, further comprising:
    determining a navigational handle for each of the plurality of documents; and
    storing the navigational handle in the document entry for each of the plurality of documents.

5. The method of claim 1, further comprising generating a set of marker values based on the index, wherein each of the set of marker values identifies a periodic entry in the index and a corresponding unique identifier of the periodic entry.

6. The method of claim 5, further comprising:
    receiving a rendering request based on the collation order; and
    setting a current entry in the index based on the rendering request and the set of marker values.

7. The method of claim 1, further comprising:
    determining a hierarchical location for each of the plurality of documents based on the collation order;
    obtaining a parent identifier for each of the plurality of documents based on the hierarchical location; and
    storing the parent identifier in the document entry for each of the plurality of documents.

8. The method of claim 7, further comprising:
    obtaining the maximum distribution value;
    determining that a hierarchical location includes a number of child locations that exceeds the maximum distribution value;
    automatically generating a plurality of new hierarchical locations based on the maximum distribution value, the hierarchical location and the summary information; and
    automatically relocating the child locations of the hierarchical location to one of the plurality of new hierarchical locations such that each new hierarchical location includes a number of child locations that is less than the maximum distribution value.

9. The method of claim 8, wherein the automatically generating step includes generating a new attribute based on the rendering information.

10. The method of claim 1, further comprising:
determining a set of categories based on the collation order;
generating a category entry for each of the set of categories; and
storing each category entry in the relational database, wherein each of the plurality of documents is located under at least one category.

11. The method of claim 1, further comprising:
receiving a linking request to link data stored in a relational table row to one of the plurality of documents;
creating a linking entry based on a primary key for the row and the one of the plurality of documents; and
storing the linking entry in a linking table in the relational database.

12. A method, implemented on a computer device, of managing document summary information, the method comprising:
obtaining a set of collation orders, wherein each collation order defines a sort order for summary information for a plurality of documents based on a set of attributes for the plurality of documents;
maintaining a summary table in a relational database, wherein the summary table includes a document entry for each of the plurality of documents and wherein each document entry includes a unique identifier for the document, a value for each of the set of attributes and rendering information for displaying a summary of the document;
generating a set of indexes for the summary table, wherein each index is based on one of the set of collation orders, and wherein each index includes the unique identifier, the set of attributes values, and the rendering information for each document entry; and
generating a set of categories for at least one collation order, wherein the set of categories defines a hierarchical structure for displaying the document summary information, and wherein each of the plurality of documents is located under at least one category, wherein the generating the set of categories step includes automatically generating a plurality of new categories based on a category that includes a number of child hierarchical locations that exceeds a maximum distribution value.

13. The method of claim 12, further comprising generating a set of marker values for each index, wherein each of the set of marker values identifies a periodic entry in the index and a corresponding unique identifier of the periodic entry.

14. The method of claim 12, further comprising generating a set of linking entries, wherein each of the set of linking entries defines a link between data stored in a relational table row and a hierarchical location in the hierarchical structure.

15. A document system for managing document summary information, the document system comprising:
at least one computing device including:
a processor; and
a memory, the memory including:
a system for obtaining a set of collation orders, wherein each collation order defines a sort order for summary information for a plurality of documents based on a set of attributes for each of the plurality of documents;
a system for maintaining a summary table in a relational database, wherein the summary table includes a document entry for each of the plurality of documents and wherein each document entry includes a unique identifier for the document, a value for each of the set of attributes and rendering information for displaying a summary of the document;
a system for generating a set of indexes for the summary table, wherein each of the set of indexes is based on one of the set of collation orders, and wherein each index includes the unique identifier, the set of attributes values, and the rendering information for each document entry;
a system for generating a set of categories for at least one collation order, wherein the set of categories defines a hierarchical structure for displaying the document summary information, and wherein each of the plurality of documents is located under at least one category, wherein the system for generating the set of categories automatically generates a plurality of new categories based on a category that includes a number of child locations that exceeds a maximum distribution value.

16. The document system of claim 15, the at least one computing device further including a system for generating a set of marker values for each of the set of indexes, wherein each of the set of marker values identifies a periodic entry in the index and a corresponding unique identifier of the periodic entry.

17. The document system of claim 15, the at least one computing device further including a system for generating a set of linking entries, wherein each of the set of linking entries defines a link between data stored in a relational table row and a hierarchical location in the hierarchical structure.

18. The document system of claim 15, wherein the value for each of the set of attributes is stored in one of a plurality of data types.

19. The document system of claim 15, wherein each system comprises a program product stored on a memory.

* * * * *